(12) United States Patent
Jorgovanovic

(10) Patent No.: US 10,299,278 B1
(45) Date of Patent: May 21, 2019

(54) CHANNEL SELECTION FOR MULTI-RADIO DEVICE

(71) Applicant: Amazon Technologies, Inc., Seattle, WA (US)

(72) Inventor: Milos Jorgovanovic, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 15/463,429

(22) Filed: Mar. 20, 2017

(51) Int. Cl.
*H04L 12/26* (2006.01)
*H04W 72/04* (2009.01)
*H04W 28/02* (2009.01)
*H04W 4/80* (2018.01)
*H04W 84/12* (2009.01)

(52) U.S. Cl.
CPC ......... *H04W 72/0486* (2013.01); *H04W 4/80* (2018.02); *H04W 28/0289* (2013.01); *H04W 84/12* (2013.01)

(58) Field of Classification Search
USPC ....... 370/229, 230, 235, 236, 237, 241, 252, 370/328, 329, 331, 332, 343, 437, 465, 370/466
See application file for complete search history.

(56) References Cited

U.S. PATENT DOCUMENTS

| | | | | |
|---|---|---|---|---|
| 2005/0239497 | A1* | 10/2005 | Bahl | H04L 12/5692 455/552.1 |
| 2012/0062715 | A1* | 3/2012 | Endo | A61B 1/00016 348/65 |
| 2013/0039181 | A1* | 2/2013 | Chao | H04W 48/16 370/235 |
| 2015/0282064 | A1* | 10/2015 | Patil | H04W 48/20 370/329 |
| 2015/0365986 | A1* | 12/2015 | Lee | H04W 4/008 370/329 |
| 2018/0184231 | A1* | 6/2018 | Egner | H04W 4/06 |

* cited by examiner

*Primary Examiner* — Kwang B Yao
*Assistant Examiner* — Nguyen H Ngo
(74) *Attorney, Agent, or Firm* — Pierce Atwood LLP

(57) ABSTRACT

A multi-radio wireless device capable of communicating on several wireless communication protocols (WCP) such as Wi-Fi, Bluetooth, ZigBee, etc. may select a communication channel for a desired WCPs by measuring both overlapping and non-overlapping channels of another WCP and determining combined congestion metrics (which measure communications of other devices using the particular channels) for those overlapping and non-overlapping channels. Each channel of the desired WCP may be measured using different combined congestion metrics as well as the individual congestion metrics for the potential channels of the desired WCP. The availability of particular channels of the desired WCP may be measured in this way to select a channel of the desired WCP that is most likely to be available and whose potentially interfering traffic (as measured by the congestion metrics) is least likely to interfere with other communications of a device, including other communications on other WCPs.

20 Claims, 10 Drawing Sheets

FIG. 4
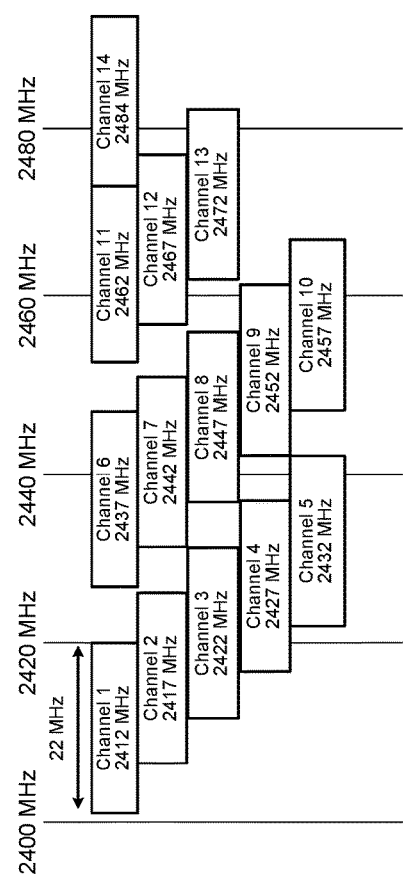
2.4 GHz Band Wi-Fi Channels
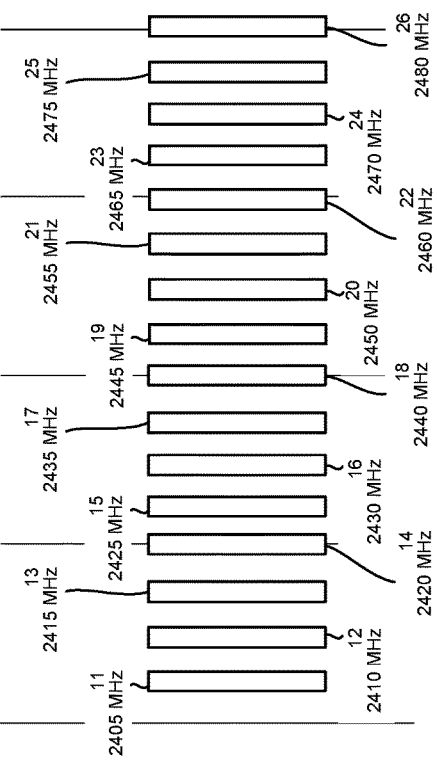
2.4 GHz Band ZigBee Channels

CHANNEL SELECTION FOR MULTI-RADIO DEVICE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 4 illustrates Wi-Fi and ZigBee channels in the 2.4 GHz wireless spectrum band.

DETAILED DESCRIPTION

Figure 1:
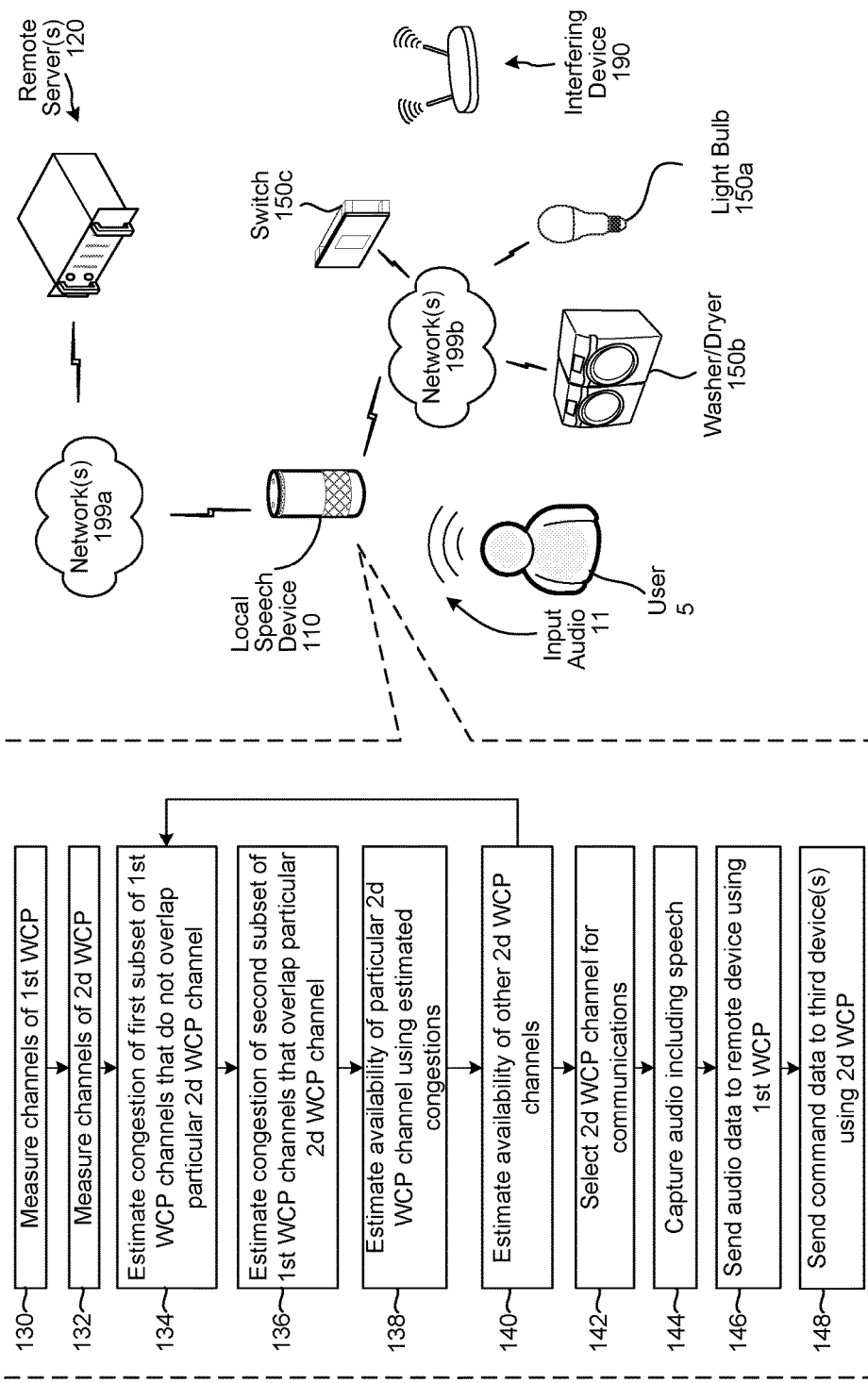
FIG. 1 illustrates a speech processing system with a local device configured to select a channel for wireless communications with nearby devices according to embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

A speech processing system may be configured as a relatively self-contained system where one device captures audio, performs speech processing, and executes a command corresponding to the input speech. Alternatively, a speech processing system may be configured as a distributed system where a number of different devices combine to capture audio of a spoken utterance, perform speech processing, and execute a command corresponding to the utterance. Although the present application describes a distributed system, the teachings of the present application may apply to any system configuration.

Depending on system configuration, a speech processing system may be capable of executing a number of different commands such as playing music, answering queries using an information source, opening communication connections, sending messages, shopping, controlling other devices, etc. In particular, the control of multiple devices using speech, even if such devices do not have an equipped microphone, can result in an overall system that gives a user significant control over many different products.

In order to control devices without a microphone, or devices that are manufactured by an entity other than the one operating the speech processing system, an interface device may be used. The interface device may communicate between the device to be controlled and the speech processing system and may pass commands from a device of the speech processing system (such as a remote server) and the device to be controlled. One aspect of this approach is the high number of separate devices that can be involved in executing a single command. For example, to execute a single spoken command, four or more devices may be involved. A first local speech device may capture the user's speech and send audio data of the speech to a remote device (such as a server), the server (or, as is common, a bank of multiple servers) may perform ASR and NLU to determine what command was intended by the speech and then send command data to the interface device, the interface device then sends the command data (or some variation hereof) to the device to be controlled, and then the device to be controlled executes the command. The large number of devices involved in the processing may lead to undesired latency. Further, up to three of the devices involved in the processing may reside proximate to the user (e.g., in the user's home) and thus must be purchased by the user, leading to additional user costs.

For example, if a user speaks a command to turn on a light in the user's home, the speech is captured by a local speech device (or a microphone communicatively connected to the local speech device) nearby to (e.g., local) the user, which then sends audio data (for example, over the internet) to a remote server(s). The server(s) processes the speech and then sends command data to the interface device which is typically an internet accessible hub device that resides in the user's home. The interface device then sends a command to the light, typically over a low power or similar type wireless network. In this example the local speech device, interface device, and light all reside proximate to the user in the user's home.

To improve the pipeline of command execution, to reduce the reliance on third party routing, and to reduce the cost to users, it may be desirable to incorporate at least some of the interface device's functionality into the local speech device. To do so, however, may involve configuring the local speech device to communicate not only with the remote server(s) 120, but also with multiple devices that can be controlled with speech such as lights, appliances, and other such electronics. To enable these communications the local speech device may be equipped to communicate using several different wireless communication protocols (WCPs) including Wi-Fi (for example for internet communications with the speech processing system), Bluetooth and/or Bluetooth Low Energy (BTLE) (for communication with peripherals such as speakers, headphones, or the like), ZigBee (for communication with light switches, appliances, etc.), and/or others.

To communicate using multiple WCPs may involve the local speech device being configured with multiple radios. In certain instances operation of one radio may interfere with operation of another radio through radiative, conductive, resource collision, and/or other interference mechanisms. For example, when one radio is transmitting it may interfere with another radio's ability to receive, particularly if the radios are using adjacent or colliding communication resources, such as wireless frequency channels. Interference to the radios may take several forms including in-device interference (e.g., activity from one radio on the device may interfere with another radio on the device) or off-device interference (e.g., activity from one radio on some other device may interfere with a radio on the device). To combat such interference a device may be configured to operate in different manners under different communication conditions.

To improve device operation, offered is a device and system for selecting a communication channel for one wireless communication protocol (WCP) based on the congestion of communication traffic on channels of that WCP as well as congestion of communication traffic of another WCP operable on the device.

FIG. 1 shows a speech processing system according to aspects of the present disclosure. Although the figures and discussion illustrate certain operational steps of the system 100 in a particular order, the steps described may be performed in a different order (as well as certain steps removed or added) without departing from the intent of the disclosure. As shown in FIG. 1, the system may include one or more speech-controlled devices 110 local to user 5, and one or more servers 120 connected to speech-controlled device(s) 110 across network(s) 199a.

The server(s) 120 (which may be one or more different physical devices) may be capable of performing traditional speech processing (e.g., ASR, NLU, command processing, etc.) as described herein. A single server 120 may perform all speech processing or multiple physical servers 120 may combine to perform all speech processing. Further, the server(s) 120 may execute certain commands, such as answering spoken utterances of the users 5. In addition, certain speech detection or command execution functions may be performed by the speech-controlled device 110.

The device 110 is also connected to other peripheral devices (such as light bulb 150a, washer/dryer 150b, and switch 150c using network 199b). The network 199a may include the internet and may involve wireless communications by the local speech device 110 using a first WCP, for example Wi-Fi. The network 199b may be a local network and may involve communications by the local speech device 110 using a second WCP, for example ZigBee. Although illustrated as networks, the wireless communications (for example those between device 110 and devices 150a-c) may be direct point-to-point wireless communications.

To configure itself to communicate using the second WCP the device 110 may select a channel of the second WCP to use in communicating with one or more devices 150. To do so the device 110 may measure (130) the channels of the first WCP (e.g., the Wi-Fi WCP). This measurement may involve activating a Wi-Fi radio of the device 110 and determining what Wi-Fi signals can be detected by the device 110 during a period of time. Such signals may be generated, for example, by one or more interfering devices 190 that may be in the same general vicinity as device 110 (for example in the user's home, in a neighboring apartment, etc.). For one or more of the Wi-Fi channels the device 110 may determine the signal strength of detected signals on the channel as well as how many communications are detected on the channel, thus indicating how active (e.g., congested) the channel is. The device 110 may determine and store a congestion metric indicating how active the channel is as well as a signal strength metric (e.g., a received signal strength indicator (RSSI)) indicating the strength of communications detected on the channel. The device 110 may perform these measurements for multiple channels of the 1st WCP.

The device 110 may also measure (132) channels of the second WCP (e.g., the ZigBee WCP). This measurement may also involve determining the detected signal strength and congestion metric values of particular channels of the WCP as discussed above with regard to channels of the first WCP.

The device 110 may then perform a series of operations for particular channels of the second WCP, represented by steps 134-140. These steps estimate the availability of a particular second WCP channel using information about different subsets of channels of the first WCP. For a particular channel of the second WCP, the device 110 may identify a first subset of first WCP channels that do not overlap with the particular WCP channel. The first subset need not be all first WCP channels that do not overlap with the particular WCP channel and may simply be some grouping of those channels. The device 110 may then estimate (134) the congestion of the first subset, for example by summing the congestion of the channels of the first subset using congestion metric values that were determined above in step 130. The device 110 may then identify a second subset of first WCP channels that overlap (at least in part) with the particular WCP channel. The second subset need not be all first WCP channels that overlap with the particular WCP channel and may simply be some grouping of those channels. The device 110 may then estimate (136) the congestion of the second subset, for example by summing the congestion of the channels of the second subset using congestion metric values that were determined above in step 130. Using the congestion values of the first and second subset, as well as the congestion value for the particular channel of the second WCP (as determined above in step 132), the device 110 may estimate the availability of the particular channel of the second WCP.

The device 110 may then estimate (140) the availability of other channels of the second WCP by repeating steps 134-138 for other channels of the second WCP. The device 110 may do this for one, less than all, or all channels of the WCP. The device 110 may then select (142) a second WCP channel for communications, for example by selecting the second WCP channel that has a highest availability metric. The steps 130-142 may happen during a configuration setup process for the device 110 or may occur during some later phase.

The speech-controlled device 110 may also capture (144) audio of a spoken utterance (i.e., input audio 11) from user 5 via a microphone of the speech-controlled device 110. The speech-controlled device 110 may send (146) audio data 111 corresponding to the input audio 11 to the server 120 for processing. The device 110 may send (146) the audio data using the first WCP.

The server 120 may receive the audio data corresponding to the speech and may process the audio data to determine a request to control a third device (e.g., a device 150). The server 120 can then send a command to the device 110 to control the third device and the device 110 may send (148) command data to the third device using the second WCP.

Figure 2:
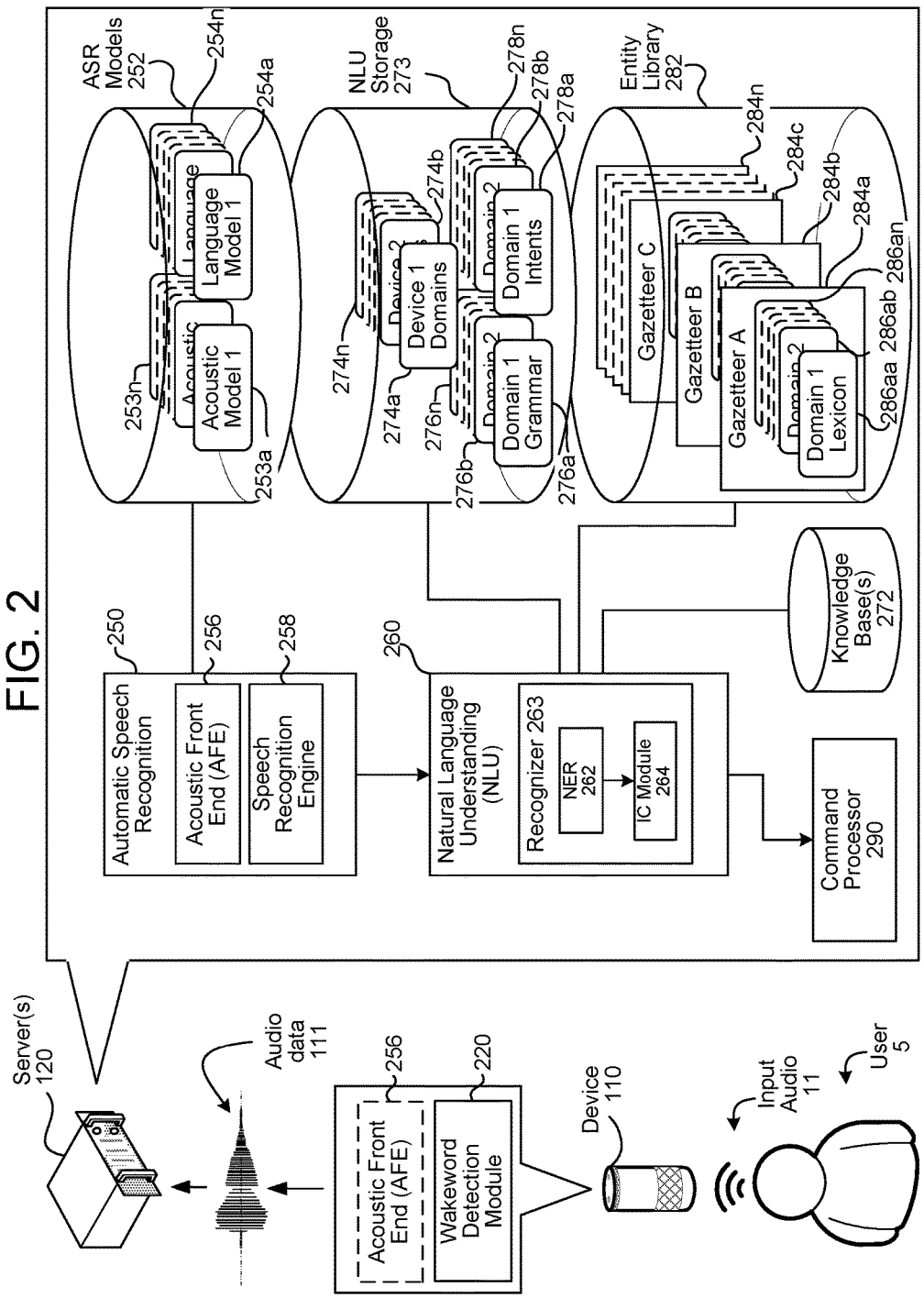
FIG. 2 is a conceptual diagram of how a spoken utterance may be processed according to embodiments of the present disclosure.

Further details of selecting a channel of the second WCP are explained below, following a discussion of the overall speech processing system of FIG. 2. The system of FIG. 1 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as the microphone of the speech-controlled device 110 (or other device), captures input audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device 110, for example a microphone (not illustrated) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another embodiment the wakeword spotting system may be built on deep neural network (DNN)/recursive neural network (RNN) structures directly, without MINI involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending.

Upon receipt by the server(s) 120, an ASR module 250 may convert the audio data 111 into text. The ASR module 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., ASR model storage 252). For example, the ASR module 250 may compare the audio data 111 with models for sounds (e.g., subword units or phonemes) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR module 250 outputs the most likely text recognized in the audio data 111. The ASR module 250 may also output multiple hypotheses in the form of a lattice or an N-best list with each hypothesis corresponding to a confidence score or other score (e.g., such as probability scores, etc.).

The device or devices including the ASR module 250 may include an AFE 256 and a speech recognition engine 258. The AFE 256 transforms the audio data 111, captured by the microphone 807, into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. Many different features may be determined, as known in the art, and each feature represents some quality of the audio that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post front-end processed data (e.g., feature vectors) may be received by the device executing ASR processing from another source besides the internal AFE 256. For example, the speech-controlled device 110 may process audio data 111 into feature vectors (e.g., using an on-device AFE 256) and transmit that information to the server 120 across the network 199 for ASR processing. Feature vectors may arrive at the server 120 encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR module 250 will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110, by the server 120, or by another device (e.g., a server running a search engine, etc.)

The device performing NLU processing 260 (e.g., server 120) may include various components, including potentially dedicated processor(s), memory, storage, etc. As shown in FIG. 2, an NLU component may include a recognizer 263 that includes a named entity recognition (NER) module 262 which is used to identify portions of query text that correspond to a named entity that may be recognizable by the system. A downstream process called named entity resolution actually links a text portion to an actual specific entity known to the system. To perform named entity resolution, the system may utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways. The NER module 262 (or other component) may also determine whether a word refers to an entity that is not explicitly mentioned in the utterance text, for example "him," "her," "it" or other anaphora, exophora or the like. A further downstream component may identify the entity referred to by the word(s), thus resolving the anaphora.

Generally, the NLU process takes textual input (such as processed from ASR 250 based on the utterance input audio 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom" (which may involve a downstream command processor 290 linked with a telephone application).

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call)

and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 272.

To correctly perform NLU processing of speech input, an NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 262 receives a query in the form of ASR results and attempts to identify relevant grammars and lexical information that may be used to construe meaning. To do so, the NLU module 260 may begin by identifying potential domains that may relate to the received query. The NLU storage 273 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, Speaker ID, or Household ID, or some other indicator.

In NLU processing, a domain may represent a discrete set of activities having a common theme, such as "shopping", "music", "calendaring", etc. As such, each domain may be associated with a particular recognizer 263, language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278. Traditionally, the determination of an intent by the IC module is performed using a set of rules or templates that are processed against the incoming text to identify a matching intent.

In order to generate a particular interpreted response, the NER 262 applies the grammar models and lexical information associated with the respective domain to actually recognize a mention one or more entities in the text of the query. In this manner the NER 262 identifies "slots" (i.e., particular words in query text) that may be needed for later command processing. Depending on the complexity of the NER 262, it may also label each slot with a type of varying levels of specificity (such as noun, place, city, artist name, song name, or the like). Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. Each slot/field corresponds to a portion of the query text that the system believes corresponds to an entity. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 262 may parse the query to identify words as subject, object, verb, preposition, etc., based on grammar rules and/or models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the knowledge base 272). So for instance, if the query was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output data from the NLU processing (which may include tagged text, commands, etc.) may then be sent to a command processor 290, which may be located on a same or separate server 120 as part of the system. The system may include more than one command processor 290, and the destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech.

If the NLU output includes a command to obtain content from another source, the command processor 290 or other component, through an application program interface (API), may send a request for such content to an appropriate application server. The application server may send the content, for example audio content, to the command processor 290 or other component. In certain instances, the output content sent from the application server may include a link that may be sent from the server 120 to the local device 110 so that the local device 110 may use the link to access the output content desired by the user. In this case the output content data may be sent from the application server through the server 120 to the local device 110 or directly from the application server to the local device 110. In certain instances the output content data may be audio data (such as music, a prerecorded reading of an audio book, etc.) and thus may be output through a speaker 101 of the local device 110.

In other instances the output content data may be text data (either generated by the application server or by a component of the server(s) 120) that needs to be converted into audio data prior to being output to a user using the local device 110. To convert text data into output audio data including speech, the system may use a text-to-speech (TTS) module.

Figure 3:
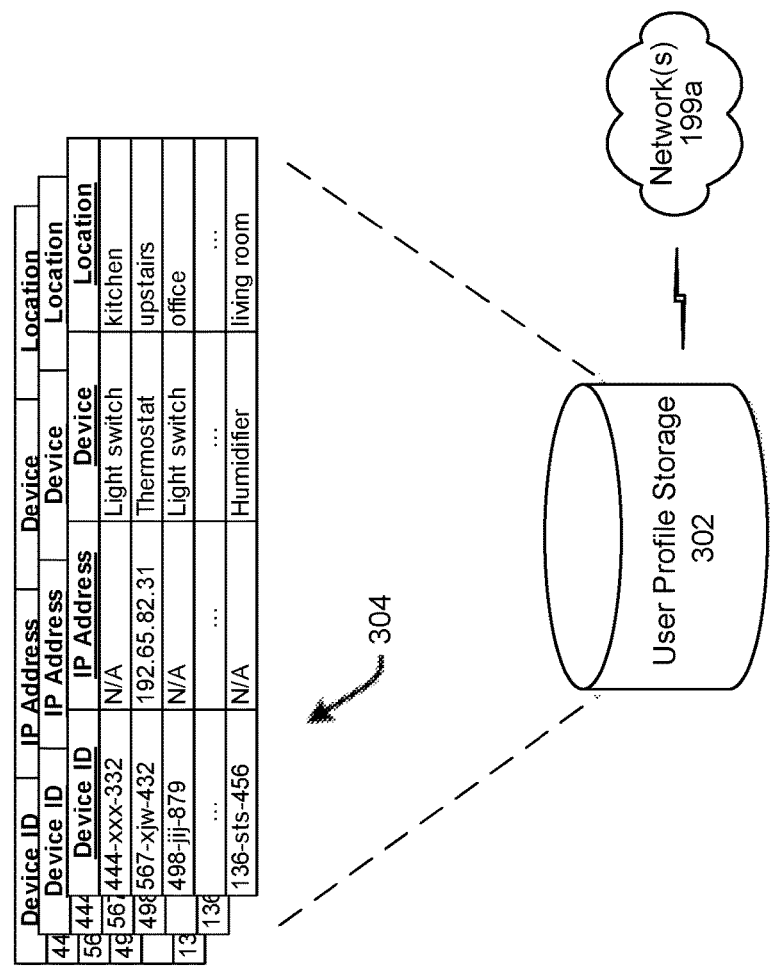
FIG. 3 illustrates data stored and associated with user profiles according to embodiments of the present disclosure.

FIG. 3 illustrates a user profile storage 302 that includes data regarding user accounts 304 as described herein. The user profile storage 302 may be located proximate to the server 120, or may otherwise be in communication with various components, for example over the network 199a. The user profile storage 302 may include a variety of information related to individual users, accounts, etc. that interact with the system. For illustration, as shown in FIG. 3, the user profile storage 302 may include data regarding the devices associated with particular individual user accounts 304. The devices may include speech-controlled devices 110 (which may include an IP address) and/or devices 150 that are controllable using the second WCP (which may not have an IP address). In an example, the user profile storage 302 is a cloud-based storage. Each user profile 304 may include data such as device identifier (ID) data, internet protocol (IP) address data if applicable, device type, and location of device data for different devices. In addition, while not illustrated, each user profile 304 may include data regarding the locations of individual devices (including how close devices may be to each other in a home, if the device location is associated with a user bedroom, etc.), address data, WCP to be used to communicate with the device or other such information.

As noted above, a speech-controlled device 110 may be configured to communicate using multiple WCPs. For example, a device 110 may include a first radio configured to communicate using a Wi-Fi WCP. Wi-Fi is a wireless communication protocol that is generally governed by the Institute of Electrical and Electronics Engineers (IEEE) 802.11 standard. Wi-Fi is commonly used to engage in internet communications. Wi-Fi may operate in a number of different wireless frequency bands including the 2.4 GHz, 3.6 GHz, 4.9 GHz, 5 GHz, and 5.9 GHz bands. In particular, the 2.4 GHz band is, in the United States, part of the industrial, scientific and medical (ISM) radio band used for various purposes.

Another WCP that uses the ISM band, and that may be used by the device 110, is ZigBee. ZigBee may operate in the United States in the 2.4 GHz band. A ZigBee WCP may operate according to the IEEE 802.15.4 standard. ZigBee communications tend to be lower power than Wi-Fi communications. ZigBee communications may involve operating using a carrier sense multiple access (CSMA) communication protocol. Other IEEE 802.15.4 communication protocols may include ISA100.11a, WirelessHART, MiWi, SNAP, Thread, or the like. Those protocols may also be used in a similar manner as ZigBee.

Other ISM WCPs that may be used by the device 110 include Bluetooth, Bluetooth low energy (BTLE) and potentially others. For each WCP capable of being used by the device 110, the device 110 may have a dedicated radio 852, discussed below in reference to FIG. 8.

As discussed above, WCPs that use adjacent or overlapping communication resources may cause interference to each other. For example, in certain geographic regions the channels used by Wi-Fi and ZigBee communications in the 2.4 GHz band are illustrated in FIG. 4. As shown in FIG. 4, a Wi-Fi channel is approximately 22 MHz wide with varying center frequencies, with each channel having a center frequency offset from the previous channel by 5 MHz. For example, Wi-Fi channel 1 has a center frequency of 2412 MHz, Wi-Fi channel 2 has a center frequency of 2417 MHz and so on. As also shown in FIG. 4, sixteen ZigBee channels (numbered channel 11 through 26) are allocated in the 2.4 GHz band, with each channel using approximately 2 MHz of bandwidth and the channels spaced 5 MHz apart from each other. For example, ZigBee channel 11 has a center frequency of 2405 MHz, ZigBee channel 12 has a center frequency of 2410 MHz and so on. While FIG. 4 illustrates potential channel conflicts between Wi-Fi and ZigBee in the 2.4 GHz band, other channel conflicts between other WCPs and other frequency bands are also possible and may be addressed by the techniques described herein. Further, different channels, wireless bands, etc. may be used differently in different geographic regions. The teachings herein may be applied taking into consideration wireless conditions and configurations in varying geographic regions.

If a Wi-Fi radio on a device 110 is communicating using a particular Wi-Fi channel (e.g., Wi-Fi channel 1) it may cause interference to communications of a ZigBee radio of the device 110 when attempting to communicate using an overlapping ZigBee channel (e.g., ZigBee channel 12) and vice-versa. ZigBee channels are only two megahertz wide and they come every 5 megahertz while Wi-Fi channels are 22 megahertz wide and also come every 5 megahertz. Thus a single Wi-Fi channel can overlap with four ZigBee channels. Further, conflicts may also occur even if the channels are adjacent but not necessarily overlapping (due to signal bleed and/or other factors). To avoid such internal conflicts the device 110 may be configured with intelligence and components (for example WCP controller 850) that controls when one radio communicates versus another, what channels are used, etc. with regard to internal potential radio interference conflicts.

Figure 5:
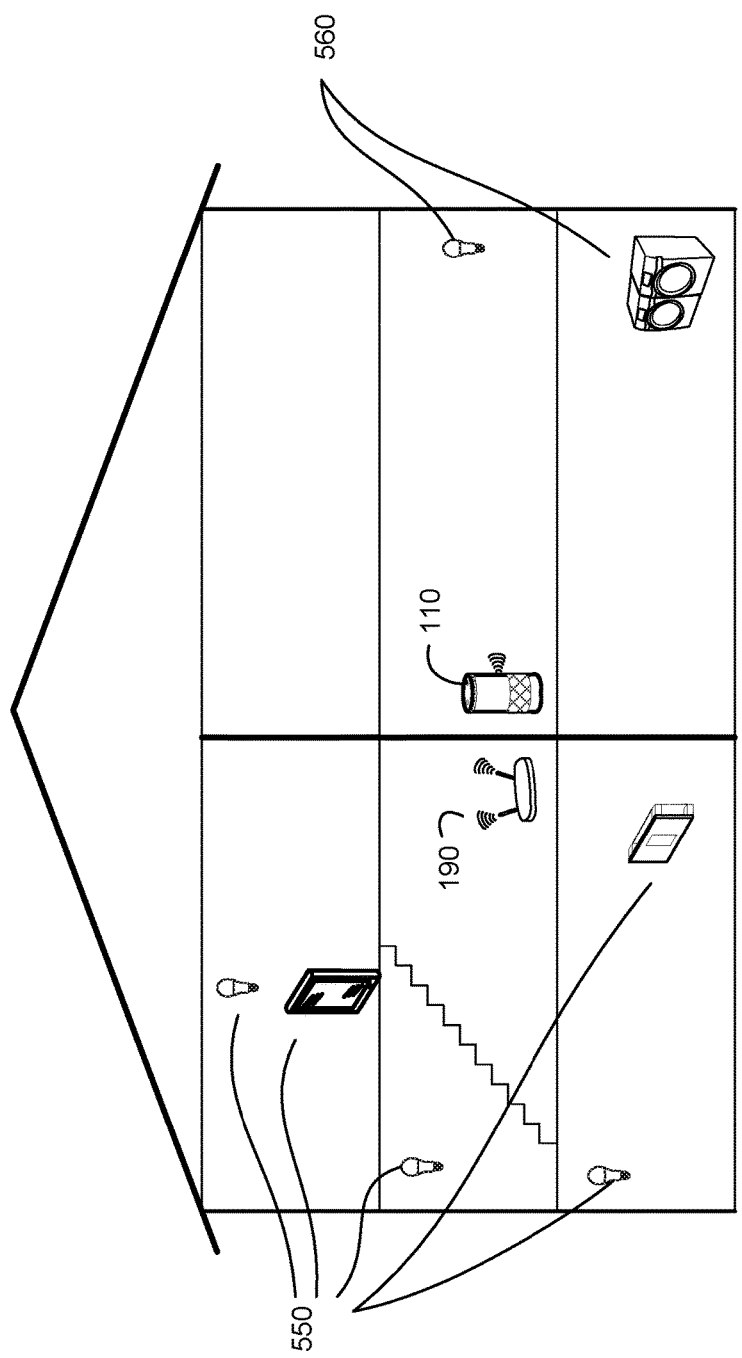
FIG. 5 illustrates a device placement according to embodiments of the present disclosure.

Internal conflicts, however, are not the only potential source of interference. If a nearby interfering device, such as device 190 is close enough to device 110 and operating using communication channels that are adjacent to and/or overlapping those used by device 110, interference to device 110 may result. For example, as shown in FIG. 5, if device 110 is attempting to communicate with devices 560 using a particular WCP (e.g., ZigBee), another potentially interfering device 190 may be attempting to communicate with devices 550 either using the same WCP (e.g., ZigBee) or a potentially conflicting WCP (e.g., Wi-Fi). While device 110 may not be able to control the communications of device 190, device 110 is capable of sensing potentially interfering signals and selecting a communication channel that is less likely to experience interference. Techniques for such channel selection are discussed herein.

Certain WCPs, such as ZigBee, may be particularly susceptible to interference from other WCPs (such as Wi-Fi, Bluetooth, etc.) due to certain conditions such as ZigBee's typical low power settings, its narrow channels, etc. Interference to ZigBee from Bluetooth or BTLE are typically only a concern if the Bluetooth/BTLE devices are very close to ZigBee. Wi-Fi communications, however, can be particularly interfering to ZigBee. For example, activity on a Wi-Fi channel can cause problems to both ZigBee transmit and ZigBee receive communication attempts. Further, other ZigBee devices can cause problems to ZigBee communications of the device 110. On the device 110, other non-ZigBee radios (e.g., Wi-Fi, Bluetooth, etc.) may be configured to stop communicating when the device 110 needs to communicate using ZigBee. Such stoppage may not harm the other WCPs as ZigBee communications tend to be sporadic.

The impact of conflicts caused by one or more interfering devices 190 to a device 110 depends on a number of factors including the distance between the device(s) 190 to device 110, the power of the signals of device 190 (e.g., RSSI of signals of device 190 detected at the location of device 110), the channels of the signals of device 190, etc.

To select a channel to use for wireless communication the device 110 may determine not only the activity and strength of potentially interfering signals that are within a particular potential channel, but also the activity and strength of potentially interfering signals that are within neighboring channels to the particular channel.

Figure 6:
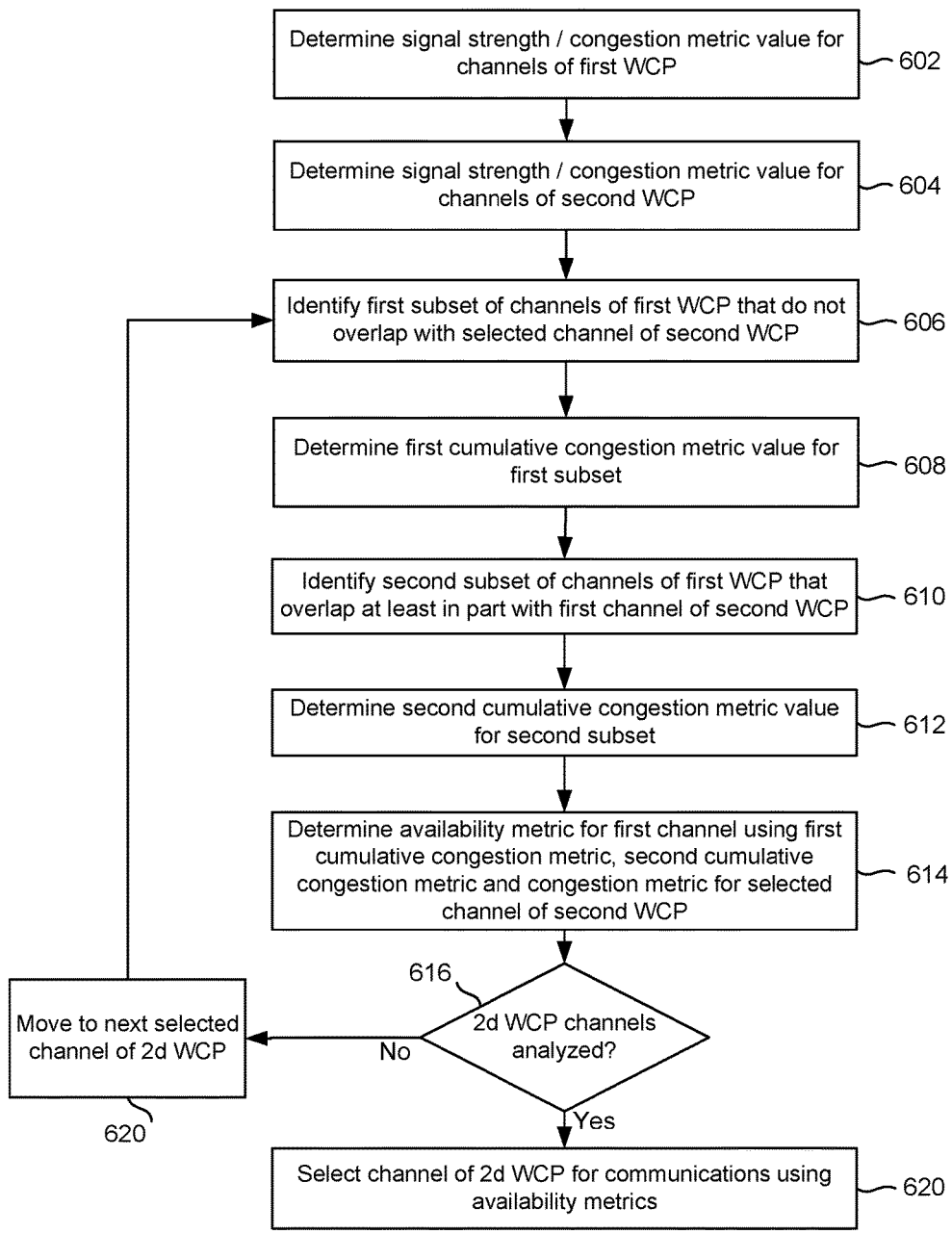
FIG. 6 illustrates selecting a channel for wireless communications according to embodiments of the present disclosure.

A technique 600 for channel selection is shown in FIG. 6. To perform the technique 600 the device may use various components including the WCP controller 850, radios 852, antenna 814, processor 804, etc. As shown in FIG. 6, a device 110 may detect signals on channels of a first WCP (e.g., Wi-Fi). The device 110 may determine (602) the detected signal strength (e.g., RSSI) of detected signals on the first WCP channels as well as a respective congestion metric value for the channels where each measured channel may have a respective congestion metric value representing the amount of traffic on the particular channel. For example, during an amount of time, the device 100 may detect a certain number of beacons on a particular channel. Each beacon may have a particular RSSI. The device 110 may then average the RSSI values of the detected beacons to determine an overall signal strength of other signals on that channel. That overall signal strength may be used to compare against a threshold as described herein.

To obtain the congestion metric value the device 110 may monitor the channel for a particular amount of time (e.g., 200 ms-1 s) and may set a congestion metric value for the channel based on the amount of activity detected during the amount of time. The congestion metric value may be a percentage or decimal representing the ratio of activity to non-activity detected on the channel, the number of signals detected during the amount of time, or some other value depending on system configuration. The congestion metric may also be a number representative of how many beacons or other communications are detected on the channel during the amount of time. The congestion metric may also represent a number of detected communications that exceed a particular signal strength threshold. The congestion metric may also represent a number of other networks or devices detected on the particular channel. The congestion metric may also represent a percentage of the measured time the channel is occupied by other signals, other devices and/or other networks.

The device 110 may also detect signals on channels of a second WCP (e.g., ZigBee). The device 110 may determine (604) the detected signal strength (e.g., RSSI) of detected signals on the second WCP channels as well as a respective congestion metric value for the channels where each measured channel may have a respective congestion metric value representing the amount of traffic on the particular channel. The congestion metric value for channels of the second WCP may be determined in a similar manner to the values determined for channels of the first WCP. The device 110 may measure all channels of the first and second WCPs or may only measure certain channels of the first and second WCPs depending on system operation.

The respective signal strength and congestion metric values for the channels of the first and second WCPs may be stored by the device in association with each channel for further use in the remaining steps as described below. Thus, for example, the device 110 may keep a record of detected channels, signal strengths (RSSI) and congestion values (Cong) as shown below:

WF [Wi-Fi] Channel 1, $RSSI_{WF\_1}$, $Cong_{WF\_1}$
WF Channel 2, $RSSI_{WF\_2}$, $Cong_{WF\_2}$
WF Channel 3, $RSSI_{WF\_3}$, $Cong_{WF\_3}$
* * *
ZB [ZigBee] Channel 11, $RSSI_{ZB\_11}$, $Cong_{ZB\_11}$
ZB Channel 12, $RSSI_{ZB\_12}$, $Cong_{ZB\_12}$
ZB Channel 13, $RSSI_{ZB\_13}$, $Cong._{ZB\_13}$
* * *

The device 110 may then undertake to determine a respective availability metric for a particular second WCP channel using the information gathered above measured RSSI and congestion metrics for channels of both the first WCP and second WCP. This involves performing the steps of 606-614, as described below, for each second WCP channel the device 110 wishes to measure (which may include some or all of the second WCP channels).

Thus, for a particular channel of the second WCP, the device will do the following. The device 110 will identify (606) a first subset of channels of the first WCP that do not overlap with the selected second WCP channel. For example, if the device 110 is measuring ZigBee channel 11, the device may select some grouping of Wi-Fi channels 2-14 for the first subset. For ZigBee channel 19, the device may select some grouping of Wi-Fi channels 1-5 or 10-14 for the first subset, and so on. The first subset may be selected so that only Wi-Fi channels that have activity above a certain first threshold are included. This first threshold may be based on congestion, signal strength, or a combination thereof. The first threshold may be determined by communication hardware of the device 110. The first threshold (called 1WCP_RSSI_non-overlap_thresh) may be set so that only if activity on the first WCP channel might block receiver activity of the second WCP channel is the first WCP channel included in the first subset. Thus the device 110 may, if configured, exclude from the first subset first WCP channels that have insufficient activity to likely receiver activity of the second WCP. The first threshold 1WCP_RSSI_non-overlap_thresh may be set to be high (e.g., −35 to −40 dB) depending on system configuration and communication conditions but may be set to not include in the first subset potential interfering signals/channels that may not actually significantly interfere with the receive activity of the second WCP channel.

Once the first subset is determined (either using the threshold or not) the device 110 may determine (608) a first cumulative congestion metric value for the first subset. This first cumulative congestion metric value represents the congestion of all the channels of the first subset. Thus, the Cong values for each of the first subset may be combined to obtain Cong_non-overlap_i, which represents the cumulative congestion metric value for potential blocking channels that do not overlap with the particular channel i (which is the channel of the second WCP for which the system is determining the availability metric). The cumulative congestion metric value Cong_non-overlap_i may be a simple summation of the individual congestion values of the signals of the first subset, may be a weighted combination of the individual congestion values, or may be some other metric value created from the individual congestion values in some other manner. The cumulative congestion metric value thus may represent a measurement of what spectrum of the band is already occupied over what percentage of time, and/or what percentage of communication resources are available to the particular second WCP channel under consideration.

As an example, for a particular ZigBee channel, the first subset may include a group of Wi-Fi channels. A device 110 may detect two Wi-Fi networks which measure a high RSSI, for example one from a home Wi-Fi and the other one from a neighbor Wi-Fi. If the home Wi-Fi has congestion of 20% and the neighbor congestion of 10%, the total congestion may be 30%, thus representing there may be a 30% chance that the ZigBee receiver will be blocked by the Wi-Fi traffic originating from these other devices.

The device 110 may identify (610) a second subset of channels of the first WCP that overlap, at least in part, with the selected second WCP channel and may determine (612) for the channels of the second subset, a cumulative congestion metric value for the channels of the second subset. These steps are similar to steps 606 and 608 for non-overlapping channels. For example, if the device 110 is measuring ZigBee channel 13, the device may select some grouping of Wi-Fi channels 1-3 for the second subset. For ZigBee channel 19, the device may select some grouping of Wi-Fi channels 6-9 for the second subset, and so on. As with the first subset, the second subset may be selected so that only Wi-Fi channels that have activity above a certain threshold are included. This second threshold may be based on congestion, signal strength, or a combination thereof. The second threshold (called 1WCP_RSSI_overlap_thresh) may be set lower than the first threshold (for example −60 to −70 dB) as the second threshold applies to overlapping channels that may be more likely to have activity that will directly impact the activity of the second WCP channel under consideration. The device 110 may then measure the a second cumulative congestion metric value for the second subset. This second cumulative congestion metric value may be referred to as Cong_overlap_i as it represents the overlapping congestion for the particular channel i.

The device 110 may then determine (614), for the selected channel i of the second WCP, an availability metric using the first cumulative congestion metric, the second cumulative congestion metric and the congestion metric for the particular channel I as determine above in step 604. The congestion metric for channel i of the second WCP may be referred to as Cong_2WCP_i. The availability metric for channel i may be determined in a number of ways and combinations including weighting, summation, or the like. One particular formula for determining the availability metric for channel i (Avail_2WCP_i) is:

$$\text{Avail\_2WCP\_}i = (1-\text{Cong\_2WCP\_}i)*(1-\text{Cong\_overlap\_}i)*(1-\text{Cong\_non-overlap\_}i)$$

though other techniques/formulas may be used. The availability metric Avail_2WCP_i thus represents the likelihood that a particular channel i of the second WCP will be available for communications without interference from overlapping signals of the first WCP (represented by Cong_overlap_i) or non-overlapping, but potential blocking signals of the first WCP (represented by Cong_non-overlap_i).

The device 110 may then check (616) to see if all the desired channels of the second WCP have been analyzed in this manner and if not (616:No), the device may move (620) to the next selected channel of the second WCP and repeat the loop of steps 606-614 for the next selected channel. For example, the device 110 may consider channel i+1, and may repeat steps 606-614 for channel i+1 which may involve determining a different first subset, different second subset, different congestion metrics (e.g., Cong_2WCP_i+1, Cong_overlap_i+1, Cong_non-overlap_i+1) and a different availability metric (e.g., Avail_2WCP_i+1). The first and second threshold may remain the same for other channels or may be configured differently depending on system operation. Thus if the system performed steps 606-614 for ZigBee channel 11, it may then perform steps 606-614 for ZigBee channel 12, though the order of processing need not happen in channel numerical order, nor need the system consider every single channel of the second WCP.

Once the device 110 has analyzed all the desired channels of the second WCP (616:Yes) and has availability metrics for those desired channels, the device 110 may then select (620) a channel of the second WCP for further communication with other devices (e.g., device(s) 150) based on the availability metrics. For example, if the device 110 has considered four channels of the second WCP, and has calculated four availability metrics (e.g., Avail_2WCP_i, Avail_2WCP_i+1, Avail_2WCP_i+2, and Avail_2WCP_i+3), the device 110 may determine which availability metric represents a greatest likelihood the particular channel will be available for communication without interference (which may be the largest or smallest availability metric depending on system configuration) and may then select the corresponding channel for further communications using the second WCP. For example, if Avail_2WCP_i represents the greatest likelihood of availability, the device 110 may select channel i for further communications using the second WCP. Thus, the channel most likely to be available may be represented as 2WCP_ch_max=max {Avail_2WCP_i} where each analyzed channel i is considered.

The device 110 may also apply a threshold to select the second WCP channel where the device 110 will make sure that the selected channel has availability above an overall congestion threshold, e.g., Cong_2WCP_i<2WCP_Cong_thresh for all 2WCP channels in the particular band (e.g., 2.4 GHz). This threshold is a value that represents how much other traffic over the second WCP the device 110 can tolerate before the other second WCP traffic will cause problems to the device's ability to communicate on the first WCP (or a third, fourth or other WCP) according to the internal algorithms and processes of the device 110. If this threshold is exceeded, the device may not be able to operate using the first WCP or other WCPs. Thus, even if a second WCP channel selected in step 620 may be free, the device 110 does not want to select a second WCP channel that will result in poor performance of other device WCPs. Such a situation may occur if the device selects a second WCP channel that has a traffic level that would still allow for sufficient second WCP communications by the device (which may be sporadic) but would regularly result in shutdown of the first (or other) WCP of the device due to regularly detected second WCP activity on the channel that does not originate from the device 110, but still may cause the internal systems of the device to shut down the first (or other WCP).

If the channel selected in step 620 satisfies the threshold (e.g., is under threshold 2WCP_Cong_thresh) the device may communicate on the selected channel. If not, the device 110 may select the second WCP channel with the best availability that actually does satisfy the overall congestion threshold, e.g., select 2WCP_ch=max {Avail_2WCP_i}<2WCP_Cong_thresh.

Figure 7:
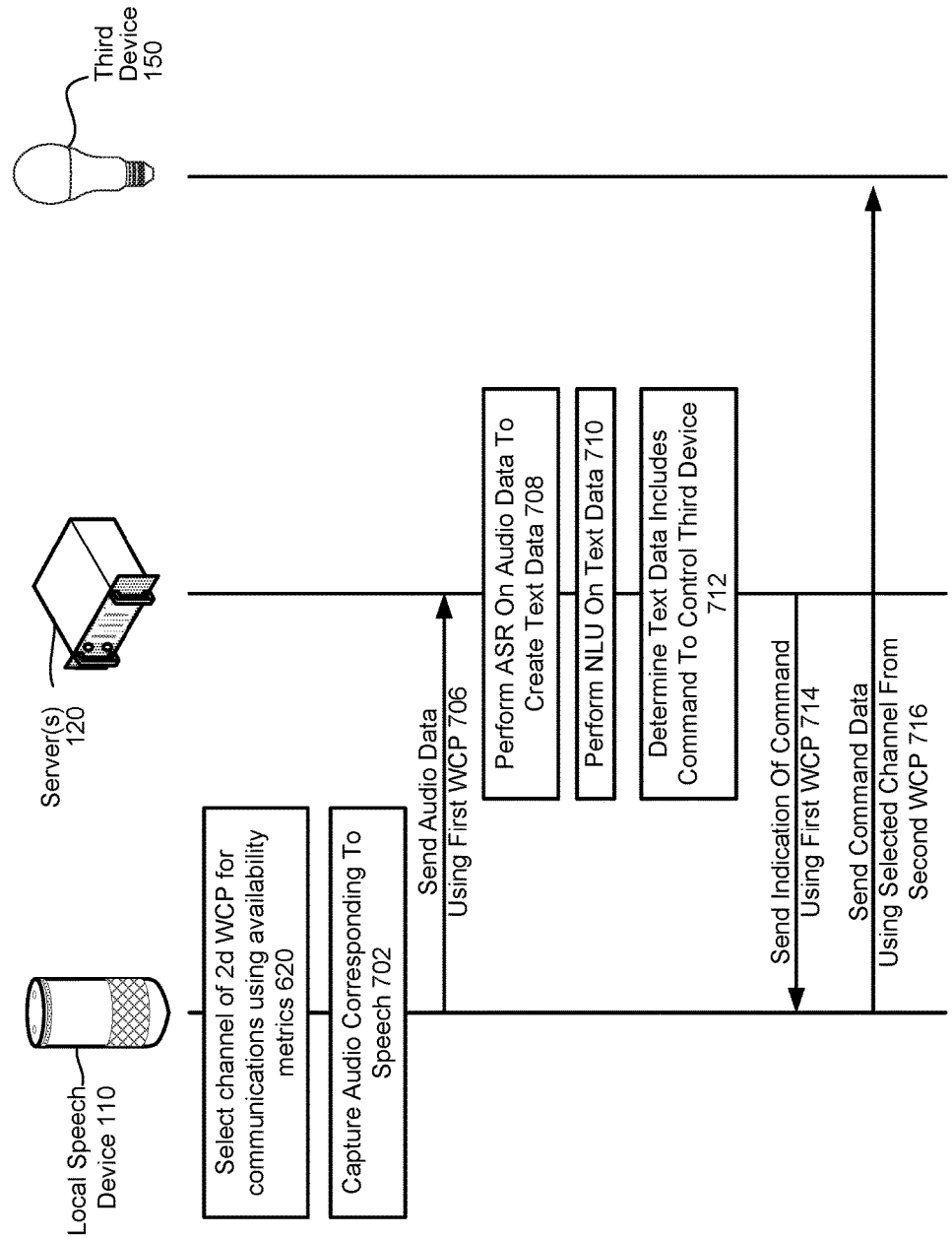
FIG. 7 illustrates capturing and processing a speech command to control a nearby device according to embodiments of the present disclosure.

Once the second WCP channel is selected, it may be used by the device 110. As shown in FIG. 7, a local speech device 110 may select (620) a channel of a second WCP (e.g., ZigBee) for communications using the availability metrics calculated above, for example in reference to FIG. 6. The device 110 may then capture (702) audio corresponding to speech. The device may then use a first WCP (e.g., Wi-Fi) to send (706) audio data corresponding to the speech to the server 120. The server 120 may then perform (708) ASR on the audio data to create text data and may perform (710) NLU on the text data to determine (712) that the text data includes a command to control a third device 150, in this case a light bulb nearby to device 110. As the device 110 is configured to communicate with the device 150, instead of sending an indication of the command to an intermediate interface device, the server 120 sends (714) an indication of the command to the device 110, which is received by the device 110 using the first WCP. The device 110 may then send (716) command data to the third device 150 using the second WCP and the channel selected in step 620. While the channel selection is illustrated as a configuration process prior to capturing speech, the device 110 may also perform channel selection steps (such as those illustrated in FIG. 6) at a different time, for example after receiving the indication of the command to operate the third device.

As can be appreciated, the channel selection process described above may depend on varying channel conditions. Thus the device 110 may regularly operate the channel selection (for example of FIG. 6) to ensure as optimal as possible selection of a channel of the second WCP.

As can also be appreciated, the placement of the device 110 may impact the strength and number of detected signals that may interfere with potential communications of the device 110. For example, as shown in FIG. 5, if device 110 is placed against a same wall as interfering device 190, device 110 may detect more and stronger potential interfering signals than if device 110 were placed on an opposite wall in the same room (e.g., near lightbulb 560). Thus, a device 110 may be configured to perform various signal measurement and channel selection operations and provide an indication to a user, such as through a text-to-speech output, a visual indicator through the device 110 or through a companion device, to move the device 110 (e.g., away from potential interferers) in order to reduce potential interference. The indication may involve a suggestion about how far to move the device where the suggestion may be based on how strong the detected potential interfering signals are. For example, using certain thresholds, the device 110 may determine that a detected RSSI of a potential interferer is high and may thus suggest a distance from a current location to move the device such that the detected RSSI would be lower (and potentially be below a threshold) at the new distance.

Various machine learning techniques may be used to perform the training of one or more machine learning models that may be used by the device, for example by the WCP controller 850 to control radio behavior, channel selection, make suggestions on device location, or the like. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

Figure 8:
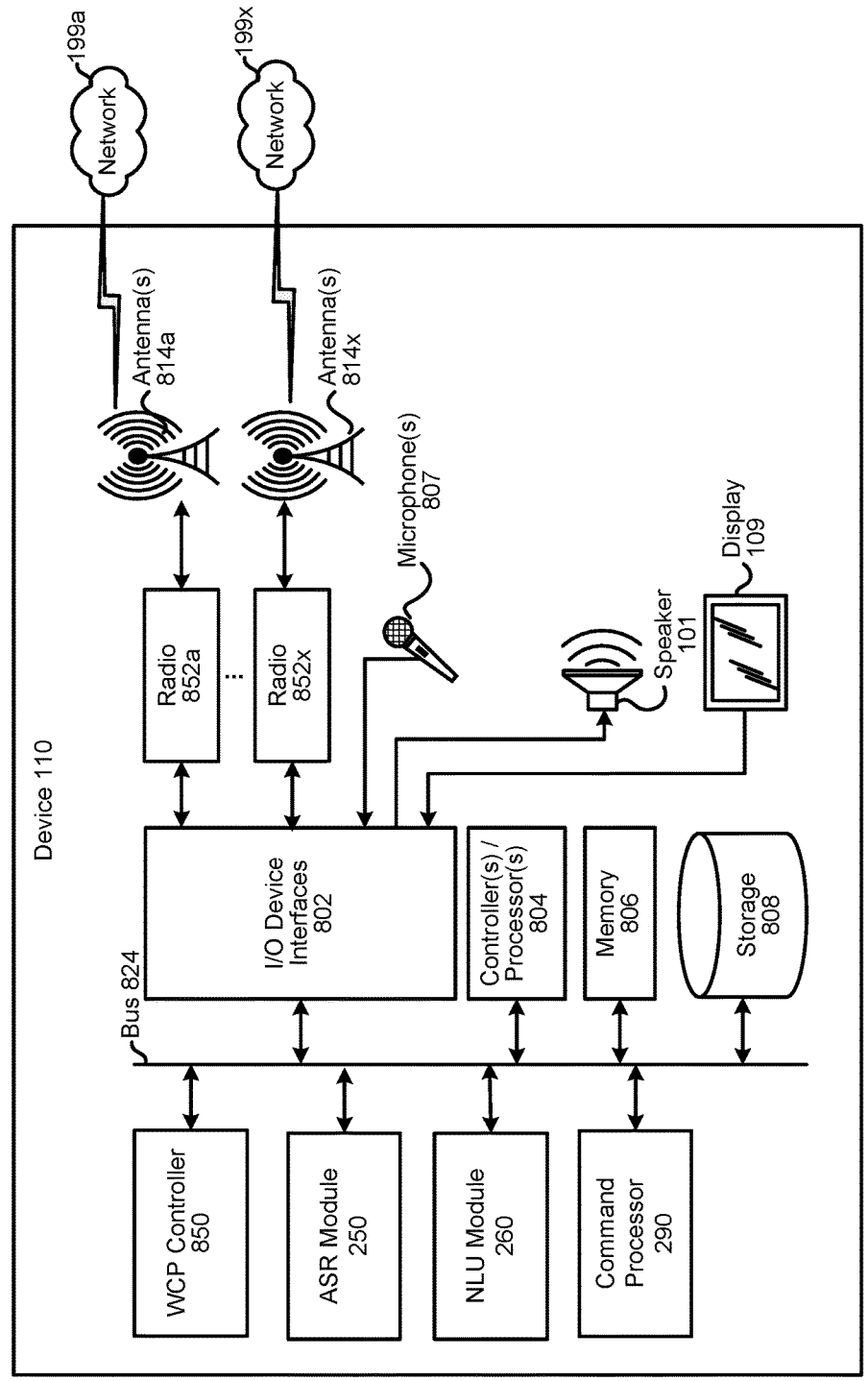
FIG. 8 is a block diagram conceptually illustrating example components of a device according to embodiments of the present disclosure.
Figure 9:
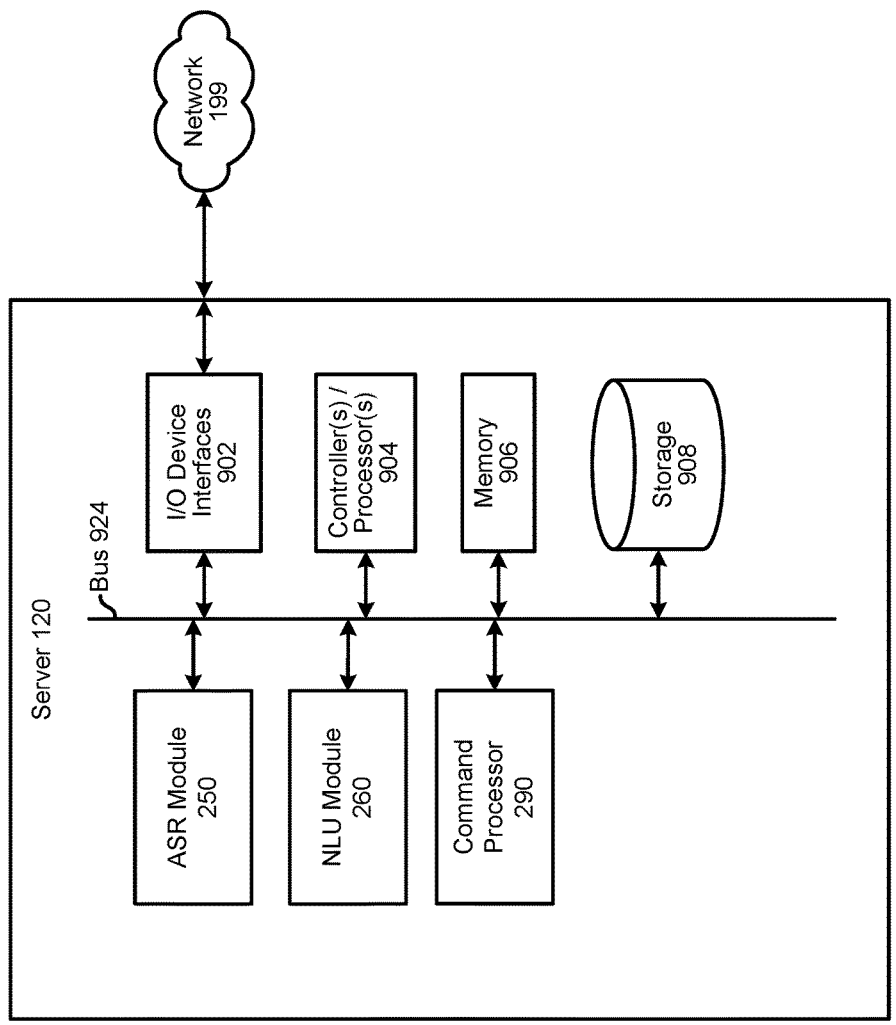
FIG. 9 is a block diagram conceptually illustrating example components of a server according to embodiments of the present disclosure.

FIG. 8 is a block diagram conceptually illustrating a user device 110 (e.g., the speech-controlled device 110 described herein) that may be used with the described system. FIG. 9 is a block diagram conceptually illustrating example components of a remote device, such as the server 120 that may assist with ASR processing, NLU processing, or command processing. Multiple servers 120 may be included in the system, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (804/904), that may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive (MRAM) and/or other types of memory. Each device (110/120) may also include a data storage component (808/908), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (802/902).

Computer instructions for operating each device (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120) includes input/output device interfaces (802/902). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Referring to FIG. 8, the device 110 may include input/output device interfaces 802 that connect to a variety of components such as an audio output component such as a speaker 101, a visual output component such as a display 109, a wired headset or a wireless headset (not illustrated), or other component capable of outputting audio. The display 109 may output image and/or video data as described herein. The device 110 may also include an audio capture component. The audio capture component may be, for example, a microphone 807 or array of microphones, a wired headset or a wireless headset (1030 illustrated in FIG. 10), etc. The microphone 807 may be configured to capture audio. If an array of microphones is included, approximate distance to a sound's point of origin may be determined by acoustic localization based on time and amplitude differences between sounds captured by different microphones of the array.

For example, via a radio 852 and antenna(s) 814, the input/output device interfaces 802 may connect to one or more networks 199 via a wireless local area network (WLAN) (such as Wi-Fi) radio, Bluetooth, BTLE, ZigBee, wireless network radio, and/or other WCPs, such as a radio capable of communication with a wireless communication network such as a Long Term Evolution (LTE) network, WiMAX network, 3G network, 4G network, etc. A wired connection such as Ethernet may also be supported. Through the network(s) 199, the speech processing system may be distributed across a networked environment. The device 110 may have multiple radios 852, where each radio may include various radio components such as a transceiver that includes a transmitter system and a receiver system and/or other components. Each radio may have one or more dedicated antenna 814 or radios may share antennas. Each radio 814 may be configured to communicate with a different WCP. For example a device 110 may have a first radio 852a configured to communicate using a first WCP (e.g., Wi-Fi), a second radio 852b configured to communicate using a second WCP (e.g., ZigBee), a third radio 852c configured to communicate using a third WCP (e.g., Bluetooth), and the like. The multiple radios 852 may allow the device 110 to communicate using multiple WCPs substantially simultaneously by managing interference issues.

The device 110 may also have a WCP controller 850 that can control the radios 852 to avoid interference both among each other internally, and with external signals as described above.

The device 110 and/or the server 120 may include an ASR module 250. The ASR module 250 in the device 110 may be of limited or extended capabilities. The ASR module 250 may include the language models 254 stored in ASR model storage component 252. If limited speech recognition is included, the ASR module 250 may be configured to identify a limited number of words, whereas extended speech recognition may be configured to recognize a much larger range of words.

The device 110 and/or the server 120 may include a limited or extended NLU module 260. The NLU module 260 in the device 110 may be of limited or extended capabilities. The NLU module 260 may comprise the name entity recognition module 262, the intent classification module 264, and/or other components. The NLU module 260 may also include a stored knowledge base and/or entity library, or those storages may be separately located.

The device 110 and/or the server 120 may also include the command processor 290 configured to execute commands/functions associated with a spoken utterance as described herein.

To create output speech, the server 120 may be configured with the TTS module 414 described in detail herein above.

As noted above, multiple devices may be employed in a single speech processing system. In such a multi-device system, each of the devices may include different components for performing different aspects of the speech processing. The multiple devices may include overlapping components. The components of the device 110 and the server 120, as illustrated in FIGS. 8 and 9, are exemplary, and may be located as a stand-alone device or may be included, in whole or in part, as a component of a larger device or system.

Figure 10:
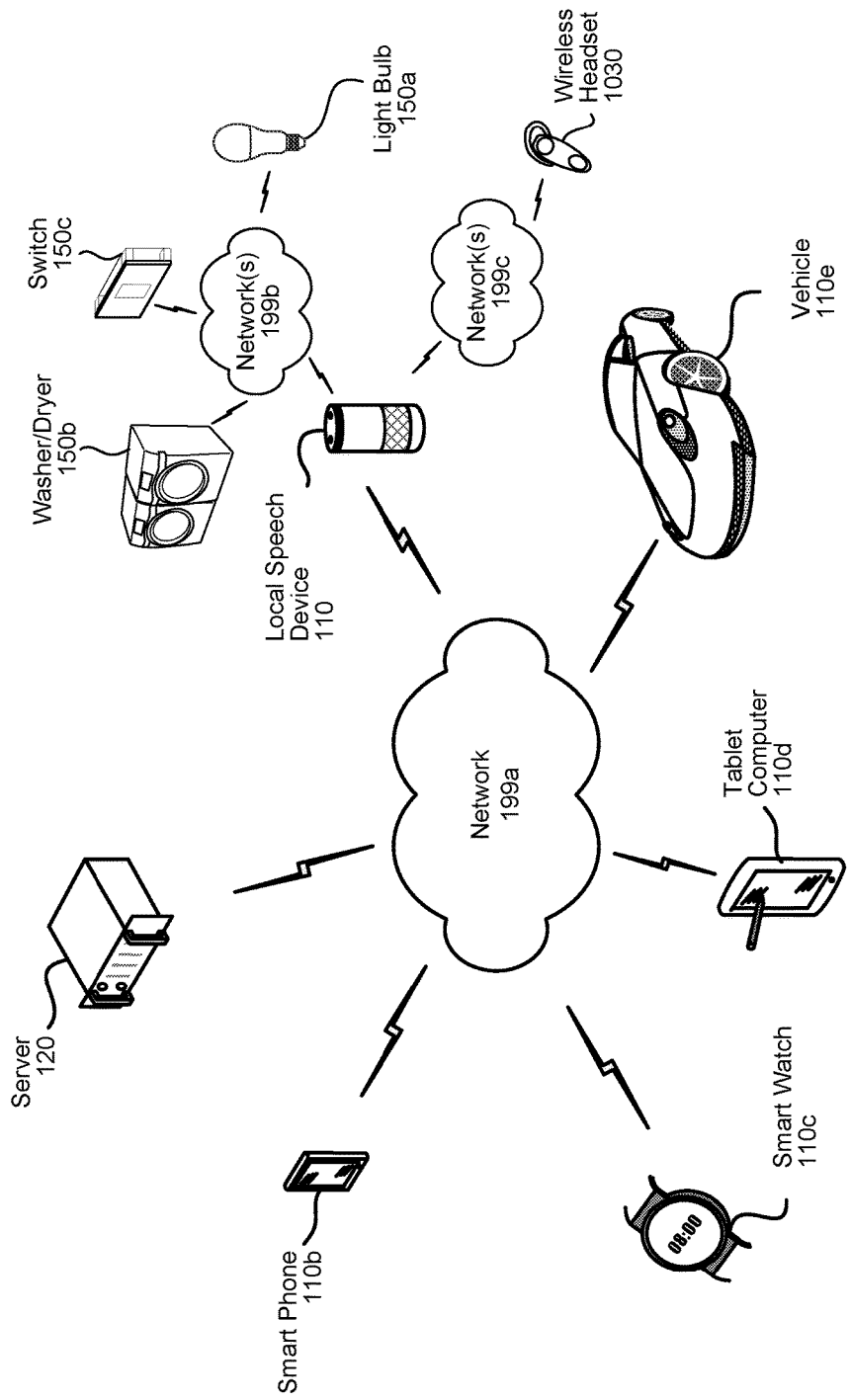
FIG. 10 illustrates an example of computer networks for use with the system.

As illustrated in FIG. 10, multiple devices (120, 110, 110b-110e) may contain components of the system 100 and the devices may be connected over a network 199. The network 199a may include a local or private network or may include a wide network such as the Internet. Devices may be connected to the network 199a through either wired or wireless connections. For example, the speech-controlled device 110, a tablet computer 110d, a smart phone 110b, a smart watch 110c, and/or a vehicle 110e may be connected to the network 199 through a wireless service provider, over a Wi-Fi or cellular network connection, or the like. Other devices are included as network-connected support devices, such as the server 120, application developer devices, or others. The support devices may connect to the network 199 through a wired connection or wireless connection. Networked devices may capture audio using one-or-more built-in or connected microphones 807 or audio capture devices, with processing performed by ASR, NLU, or other components of the same device or another device connected via the network 199a, such as the ASR module 250, the NLU module 260, etc. of one or more servers 120.

As further illustrated in FIG. 10, the local speech device 110 may be configured to communicate on multiple networks 199 using multiple WCPs, radios, etc. One network, 199a, may involve a first WCP (e.g., Wi-Fi) while another network 199b may involve a second WCP (e.g., ZigBee), while another network 199c may involve a third WCP (e.g., Bluetooth). Other non-illustrated networks are also possible. While network 199a may be a wide-area network, networks 199b and 199c may be local to the device 110.

Further, the networks 199b and 199c may involve direct communication between local speech device 110 and the other device (150a-c for network 199b and 1030 for network 199c). Thus, while illustrated as networks, the device 100 may communicate wirelessly directly with devices 150a-c (and/or other devices) using a certain WCP (such as ZigBee) and may communicate wirelessly directly with wireless headset 1030 (and/or other devices) using a different WCP (such as Bluetooth).

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 256, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Further, as used in this disclosure a "plurality" of something or a "subset" of something does not necessary mean each and every item in a group or subset unless explicitly stated otherwise. Thus a plurality or a subset may involve some, but not all, of a particular group.

As used in this disclosure, the term "a" or "one" may include one or more items unless specifically stated otherwise. Further, the phrase "based on" is intended to mean "based at least in part on" unless specifically stated otherwise.

What is claimed is:

1. A device comprising:
a first radio configured to engage in Wi-Fi communications;

a second radio configured to engage in ZigBee communications;
at least one processor; and
memory including instructions operable to be executed by the at least one processor to perform a set of actions to configure the device to:
  detect, using the first radio, a plurality of Wi-Fi signals;
  determine, for each Wi-Fi channel of a plurality of Wi-Fi channels a respective received signal strength metric and a respective congestion metric value;
  detect, using the second radio, a plurality of ZigBee signals;
  determine, for each ZigBee channel of a plurality of ZigBee channels a respective received signal strength metric and a respective congestion metric value;
  identify a first subset of the plurality of Wi-Fi channels, wherein each channel in the first subset does not overlap with a first ZigBee channel of the plurality of ZigBee channels;
  determine a first cumulative congestion metric value by adding the respective congestion metric values of the Wi-Fi channels of the first subset;
  identify a second subset of the plurality of Wi-Fi channels, wherein each channel in the second subset overlaps at least in part with the first ZigBee channel;
  determine a second cumulative congestion metric value by adding the respective congestion metric values of Wi-Fi channels of the second subset;
  determine a first availability metric for the first ZigBee channel using the first cumulative congestion metric, the second cumulative congestion metric, and a respective congestion metric value for the first ZigBee channel;
  compare the first availability metric to a second availability metric for a second ZigBee channel;
  determine, based on a result of the compare, that the first availability metric indicates a higher channel availability for the first ZigBee channel than a channel availability for the second ZigBee channel indicated by the second availability metric;
  select the first ZigBee channel for further communications; and
  engage in further communications using the first ZigBee channel.

2. The device of claim 1, wherein the instructions further configure the device to:
  determine that respective received signal strength metric values of a third subset of Wi-Fi channels of the plurality of Wi-Fi channels are above a first signal strength threshold indicating a sufficiently strong potentially interfering signal from a non-overlapping channel;
  include the third subset of Wi-Fi channels in the first subset;
  determine that respective received signal strength metric values of a fourth subset of Wi-Fi channels of the plurality of Wi-Fi channels are above a second signal strength threshold indicating a sufficiently strong potentially interfering signal from a partially overlapping channel, wherein the second signal strength threshold is lower than the first signal strength threshold; and
  include the fourth subset of Wi-Fi channels in the second subset.

3. The device of claim 1, wherein the instructions further configure the device to:
  identify a third subset of the plurality of Wi-Fi channels, wherein each channel in the third subset does not overlap with the second ZigBee channel;
  determine a third cumulative congestion metric value by adding the respective congestion metric values of the Wi-Fi channels of the third subset;
  identify a fourth subset of the plurality of Wi-Fi channels, wherein each channel in the fourth subset overlaps at least in part with the second ZigBee channel;
  determine a fourth cumulative congestion metric value by adding the respective congestion metric values of the Wi-Fi channels of the fourth subset; and
  determine the second availability metric using the third cumulative congestion metric, the fourth cumulative congestion metric, and a respective congestion metric value for the second ZigBee channel.

4. The device of claim 1, wherein the instructions further configure the device to:
  monitor, for a first time period, a first Wi-Fi channel of the plurality of Wi-Fi channels;
  determine a duration of received signals detected on the first Wi-Fi channel during the first time period; and
  set a first respective congestion metric value equal to a value of the duration divided by a length of the first time period, the first respective congestion metric value corresponding to the first Wi-Fi channel.

5. The device of claim 4, wherein the instructions further configure the device to:
  determine a duration of received signals on a second channel, of the first plurality of channels, during a first time period; and
  set a first respective congestion metric value equal to a value of the duration divided by a length of the first time period, the first respective congestion metric value corresponding to the second channel.

6. A device comprising:
  a first radio configured to engage in communications using a first wireless communications protocol (WCP);
  a second radio configured to engage in communications using a second WCP;
  at least one processor; and
  memory including instructions operable to be executed by the at least one processor to perform a set of actions to configure the device to:
    determine a respective congestion metric value for each channel of a first plurality of channels of the first WCP;
    determine a respective congestion metric value for each channel of a second plurality of channels of a second WCP;
    identify a first subset of the first plurality of channels, wherein each channel in the first subset does not overlap with a first channel of the second WCP;
    determine a first cumulative congestion metric value corresponding to the first subset using the respective congestion metric values corresponding to channels of the first subset;
    identify a second subset of the first plurality of channels, wherein each channel in the second subset overlaps at least in part with the first channel of the second WCP;
    determine a second cumulative congestion metric value corresponding to the second subset using the respective congestion metric values corresponding to channels of the second subset;
    determine a first availability metric for the first channel of the second WCP using the first cumulative congestion metric, the second cumulative congestion metric and a respective congestion metric value for the first channel of the second WCP; and
communicate with a second device using the first channel of the second WCP based at least in part on the first availability metric and a second availability metric.

7. The device of claim 6, wherein the instructions further configure the device to:
determine a respective signal strength metric value for each channel of the first plurality of channels;
determine that respective received signal strength metric values of a third subset of channels of the first plurality of channels are above a first strength threshold indicating a sufficiently strong potentially interfering signal from a non-overlapping channel; and
include the third subset in the first subset.

8. The device of claim 7, wherein the instructions further configure the device to:
determine that respective received signal strength metric values of a fourth subset of channels of the first plurality of channels are above a second signal strength threshold indicating a sufficiently strong potentially interfering signal from a partially overlapping channel, wherein the second signal strength threshold is lower than the first signal strength threshold; and
include the fourth subset in the second subset.

9. The device of claim 6, wherein the instructions further configure the device to:
identify a third subset of the first plurality of channels, wherein each channel in the third subset does not overlap with a second channel of the second WCP;
determine a third cumulative congestion metric value using the respective congestion metric values corresponding to the third subset;
identify a fourth subset of the first plurality of channels, wherein each channel in the fourth subset overlaps at least in part with the second channel of the second WCP;
determine a fourth cumulative congestion metric value using the respective congestion metric values corresponding to the fourth subset; and
determine the second availability metric for the second channel of the second WCP using the third cumulative congestion metric, the fourth cumulative congestion metric and a respective congestion metric value for the second channel of the second WCP.

10. The device of claim 9, wherein the instructions further configure the device to:
compare the first availability metric to the second availability metric;
determine that the first channel of the second WCP is more likely to be available than the second channel of the second WCP; and
communicate with the second device using the first channel of the second WCP.

11. The device of claim 6, wherein the first WCP is a WCP operating under one of the Institute of Electrical and Electronics Engineers (IEEE) 802.11 standard protocols and the second WCP is a WCP operating under the IEEE 802.15.4 standard.

12. The device of claim 6, wherein the device further comprises a microphone and the instructions further configure the device to:
capture audio comprising speech;
send audio data representing the speech to a remote device, wherein the audio data is sent using the first WCP;
receive, from the remote device, an instruction to send command data to a third device; and
send the command data to the third device, wherein the command data is sent to the third device using the second WCP.

13. A computer-implemented method comprising:
determining a respective congestion metric value for each channel of a first plurality of channels of a first wireless communications protocol (WCP);
determining a respective congestion metric value for each channel of a second plurality of channels of a second WCP;
identifying a first subset of the first plurality of channels, wherein each channel in the first subset does not overlap with a first channel of the second WCP;
determining a first cumulative congestion metric value corresponding to the first subset using the respective congestion metric values corresponding to channels of the first subset;
identifying a second subset of the first plurality of channels, wherein each channel in the second subset overlaps at least in part with the first channel of the second WCP;
determining a second cumulative congestion metric value corresponding to the second subset using the respective congestion metric values corresponding to channels of the second subset;
determining a first availability metric for the first channel of the second WCP using the first cumulative congestion metric, the second cumulative congestion metric and a respective congestion metric value for the first channel of the second WCP; and
communicating with a second device using the first channel of the second WCP based at least in part on the first availability metric and a second availability metric.

14. The computer-implemented method of claim 13, further comprising:
determining a respective signal strength metric value for each channel of the first plurality of channels; and
determining that respective received signal strength metric values of a third subset of channels of the first plurality of channels are above a first strength threshold indicating a sufficiently strong potentially interfering signal from a non-overlapping channel; and
including the third subset in the first subset.

15. The computer-implemented method of claim 14, further comprising:
determining that respective received signal strength metric values of a fourth subset of channels of the first plurality of channels are above a second signal strength threshold indicating a sufficiently strong potentially interfering signal from a partially overlapping channel, wherein the second signal strength threshold is lower than the first signal strength threshold; and
including the fourth subset in the second subset.

16. The computer-implemented method of claim 13, further comprising:
determining a duration of received signals on a second channel, of the first plurality of channels, during a first time period; and
setting a first respective congestion metric value equal to a value of the duration divided by a length of the first time period, the first respective congestion metric value corresponding to the second channel.

17. The computer-implemented method of claim 13, further comprising:
  identifying a third subset of the first plurality of channels, wherein each channel in the third subset does not overlap with a second channel of the second WCP;
  determining a third cumulative congestion metric value using the respective congestion metric values corresponding to the third subset;
  identifying a fourth subset of the first plurality of channels, wherein each channel in the fourth subset overlaps at least in part with the second channel of the second WCP;
  determining a fourth cumulative congestion metric value using the respective congestion metric values corresponding to the fourth subset; and
  determining the second availability metric for the second channel of the second WCP using the third cumulative congestion metric, the fourth cumulative congestion metric and a respective congestion metric value for the second channel of the second WCP.

18. The computer-implemented method of claim 17, further comprising:
  comparing the first availability metric to the second availability metric;
  determining that the first channel of the second WCP is more likely to be available than the second channel of the second WCP; and
  communicating with the second device using the first channel of the second WCP.

19. The computer-implemented method of claim 13, wherein the first WCP is a WCP operating under one of the Institute of Electrical and Electronics Engineers (IEEE) 802.11 standard protocols and the second WCP is a WCP operating under the IEEE 802.15.4 standard.

20. The computer-implemented method of claim 13, further comprising:
  capturing, using a microphone, audio comprising speech;
  sending audio data representing the speech to a remote device, wherein the audio data is sent using the first WCP;
  receiving, from the remote device, an instruction to send command data to a third device; and
  sending the command data to the third device, wherein the command data is sent to the third device using the second WCP.

* * * * *